United States Patent
Shiozawa et al.

(10) Patent No.: US 7,914,716 B2
(45) Date of Patent: Mar. 29, 2011

(54) MEASUREMENT CONTROL METHOD OF AN INJECTION MOLDING MACHINE

(75) Inventors: Fumio Shiozawa, Nagano-ken (JP); Tetsuo Ikeda, Nagano-ken (JP); Takashi Hakoda, Nagano-ken (JP); Hidenobu Yoda, Nagano-ken (JP)

(73) Assignee: Nissei Plastic Industrial Co., Ltd., Nagano-ken (JP)

( * ) Notice: Subject to any disclaimer, the term of this patent is extended or adjusted under 35 U.S.C. 154(b) by 424 days.

(21) Appl. No.: 11/445,168

(22) Filed: Jun. 2, 2006

(65) Prior Publication Data

US 2006/0288791 A1  Dec. 28, 2006

(30) Foreign Application Priority Data

Jun. 13, 2005  (JP) ................................. 2005-172029

(51) Int. Cl.
  *B29C 45/76* (2006.01)
(52) U.S. Cl. ...... 264/40.1; 264/40.7; 425/135; 425/145; 425/149; 425/150
(58) Field of Classification Search .................. 700/200; 264/40.7, 40.1; 425/145, 135, 149, 150
  See application file for complete search history.

(56) References Cited

U.S. PATENT DOCUMENTS

| | | | | |
|---|---|---|---|---|
| 5,371,450 A * | 12/1994 | Hiraoka | ......................... | 318/560 |
| 5,518,671 A * | 5/1996 | Takizawa et al. | ............. | 264/40.1 |
| 5,585,053 A * | 12/1996 | Arai | .............................. | 264/40.1 |
| 6,284,170 B1 * | 9/2001 | Hiraoka | ........................ | 264/40.1 |
| 6,371,748 B1 * | 4/2002 | Hara | .......................... | 425/145 |
| 6,565,781 B2 * | 5/2003 | Konno | .......................... | 264/40.1 |
| 7,021,917 B2 * | 4/2006 | Uchiyama et al. | ............. | 425/149 |
| 7,125,232 B2 * | 10/2006 | Watanabe et al. | .............. | 425/145 |
| 7,235,198 B2 * | 6/2007 | Shiraishi et al. | .............. | 264/40.1 |
| 2004/0096534 A1* | 5/2004 | Shiraishi et al. | ............... | 425/159 |

FOREIGN PATENT DOCUMENTS

JP   6-61800 B2   8/1994
JP   2004-154988 A   6/2004

* cited by examiner

*Primary Examiner* — Yogendra N Gupta
*Assistant Examiner* — Amjad Abraham
(74) *Attorney, Agent, or Firm* — Birch, Stewart, Kolasch & Birch, LLP

(57) ABSTRACT

A measurement control method uses an ending target position Xes calculated by adding a prescribed length Ls to a measurement ending position Xe. A rotation rate pattern Ar for rotating a screw 2, a back pressure Ps in relation to the screw 2, and a retraction rate pattern Ab for the screw 2 to retract, are set in advance. The remaining rotation rate pattern Ar to stop the rotation of the screw 2 at the ending target position Xes from the detected screw position X, is calculated at the time of measurement, and the rotation of the screw 2 is stopped based on the calculation. Further, the remaining retraction rate pattern Ab is calculated from the detected retraction rate Vd, and the retraction of the screw 2 is stopped based on the calculation. The result is the stopping of the screw at the measurement ending position Xe.

10 Claims, 8 Drawing Sheets

MEASUREMENT CONTROL METHOD OF AN INJECTION MOLDING MACHINE

BACKGROUND OF THE INVENTION

1. Field of the Invention

The present invention relates to a measurement control method of an injection molding machine that performs a measurement by screw rotation and ends the measurement when the screw retracts to a preset measurement ending position.

2. Description of the Relevant Art

In general, an injection cycle of an injection molding machine has a measurement process and an injection process; and during the measurement process, measurement is performed by rotating a screw while measurement control is performed in which measurement is ended when a screw is retracted to a preset measurement ending position. However, although various types of measurements are taken during the measurement process such as rate control, pressure control, and position control, increasing the control precision for a series of controls in the measurement process is extremely important for securing consistent injection molding quality and obtaining an injection molded object of high quality; and various measurement control methods have conventionally been disclosed.

For example, in Japanese Patent Gazette (Publication) No. 6 (1994)-61800, a control method for retracting a screw to a preset number of screw rotations while rotating the screw, and for stopping the screw at a preset measurement ending position, and a measurement control method (measurement control device) of an injection molding machine for receiving a screw retraction rate detected by a screw rate detection means and a screw position detected by a screw position detection means, and for calculating the number of screw rotations so as to stop the screw at a measurement ending position by a predetermined calculation formula, and for sending out the calculated number of screw rotations as a rotation drive command, is disclosed. Further, in Japanese Laid Open Patent Publication No. 2004-154988, a measurement control method for an injection molding machine (measurement method) for controlling the screw rotation rate as a screw rotation rate command by deriving the screw rotation rate proportional to the position deviation between the set measurement ending position and the current screw retraction position then by correcting the screw rotation rate based on the pressure deviation between the set resin pressure and the currently detected resin pressure for the screw rotation rate after a screw is retracted to a set screw position in the vicinity of the set measurement ending position, is disclosed.

However, the conventional measurement control method for an injection molding machine as described above has the following problems.

First, as described in aforementioned Publication No. 6 (1994)-61800, when adopting a control method that detects the screw position and the screw retraction rate and calculates the number of screw rotations to stop the screw by a measurement ending position while making the calculated number of screw rotations to be a rotation drive command, a significant amount of time is required until a screw arrives at the measurement ending position as the rotation rate of a screw near to the measurement ending position approaches zero without limit. Since shortening the cycle time to something that is beneficial to raising the control precision of the screw position cannot be devised, a limitation occurs in the extent to which injection molding efficiency and mass productivity can be raised while being extremely inconvenient relative to realizing high speed injection molding.

Further, as shown in aforementioned Publication No. 2004-154988, when adopting a measurement control method which makes a screw rotation rate command by deriving a screw rotation rate that is proportional to the position deviation between the set measurement ending position and the current screw retraction position while correcting it by the pressure deviation between the set resin pressure and the currently detected resin pressure after a screw is retracted to a set screw position in the vicinity of the set measurement ending position, control in the vicinity of the set measurement ending position is only position control, thereby creating a fixed subject of control. Therefore, it is difficult to achieve securing responsiveness and stability in something that is beneficial to raising control precision of the screw position and allows back pressure control in a minimal length area while back control requires adjustments in the screw rotation rate as well as inviting complications to control.

Further, although measurement control is required to secure a high degree of measurement precision in reliably stopping both the screw rotation and retraction at a measurement ending position (measurement ending position), in neither case is consideration given to reliably stopping both the screw rotation and retraction, and nor do they especially provide sufficient measures for the formation of, for instance, a thin optical disk recently requiring a high degree of measurement precision.

SUMMARY OF THE INVENTION

The objective of the present invention is to provide a measurement control method of an injection molding machine that secures a high degree of measurement precision by accurately and reliably stopping both the screw rotation and retraction in a set measurement ending position, and especially to provide a measurement control method of an injection molding machine that is sufficiently suited to the formation of, for instance, a thin optical disk which recently especially requires a high degree of measurement precision.

A further objective of the present invention is to provide a measurement control method of an injection molding machine in which the control precision of the measurement ending position can be raised while the cycle time can shortened thereby maintaining high injection molding quality and improving injection molding efficiency and mass productivity further enabling high speed injection molding to be realized.

A further objective of the present invention is to provide a measurement control method of an injection molding machine that devises accuracy and simplicity in position control for the measurement ending position while enabling reliable and accurate back pressure control to be realized in a minimal length area by raising the responsiveness and stability of the control.

In order to achieve these objectives, the measurement control method of the injection molding machine that relates to the present invention when a measurement is performed by rotating a screw, and a measurement is ended when the screw retracts to a preset measurement ending position, comprises presetting an ending target position in which a prescribed length is added to the measurement ending position and a rotation rate pattern for rotating a screw while a screw position is detected at a prescribed time interval at the time of measurement, while the remaining rotation rate pattern for stopping the rotation of the screw at the ending target position from the detected screw position is predicted by calculation, and while the rotation of the screw is controlled by the predicted rotation rate pattern and the rotation of the screw is controlled to stop when the screw reaches the measurement ending position.

Furthermore, the measurement control method that relates to another embodiment of the present invention in which a measurement is performed by rotating a screw, and a measurement is ended when the screw retracts to a preset measurement ending position, comprises presetting back pressure in relation to the screw and a hypothetical retraction rate pattern for the screw to retract while a screw retraction rate is detected at a prescribed time interval at the time of measurement, while the remaining retraction rate pattern is predicted by calculation from the detected retraction rate, and while the limit value for the retraction rate is set, and while the retraction of the screw is controlled by selecting the smaller control amount of either a pressure control amount for performing the back pressure control or a position control amount for performing the position control to the measurement ending position at the time of prediction, and the retraction of the screw is controlled to stop when the screw reaches the measurement ending position.

In addition, the measurement control method that relates to another embodiment of the present invention in which a measurement is performed by rotating a screw, and a measurement is ended when the screw retracts to a preset measurement ending position, comprises: a measurement control method of an injection molding machine in which an operation control of the screw rotation side where an ending target position in which a prescribed length is added to the measurement ending position, a rotation rate pattern for rotating a screw, a back pressure in relation to the screw as well as a hypothetical retraction rate pattern for the screw to retract are preset, and while a screw position is detected at a prescribed time interval at the time of the measurement, and the remaining rotation rate pattern for stopping the rotation of the screw at the ending target position from the detected screw position is predicted by calculation, and while the rotation of the screw is controlled by the predicted rotation rate pattern, and the rotation of the screw is controlled to stop when the screw reaches the measurement ending position; and an operation control of the screw retraction side where the retraction rate of the screw is detected at a prescribed time interval, and the remaining retraction rate pattern is predicted by calculation from the detected retraction rate, and while the limit value for the retraction rate is set, and while the retraction of the screw is controlled by selecting the smaller control amount of either a pressure control amount for performing the back pressure control or a position control amount for performing the position control to the measurement ending position at the time of prediction, and the retraction of the screw is controlled to stop when the screw reaches the measurement ending position.

DETAILED DESCRIPTION OF THE PREFERRED EMBODIMENT

A detailed description is given hereafter by using preferred embodiments that relate to the present invention with reference to drawings. In addition, the attached drawings are not for specifying the present invention, but which are for making it easier to understand the present invention. Further, in order to avoid any obscuring, a detailed description is omitted regarding the areas which are common knowledge.

First, the construction of an injection molding machine M that has the ability to implement a measurement control method that relates to the present embodiment is described with reference to the FIG. 3 and FIG. 4.

Figure 3:
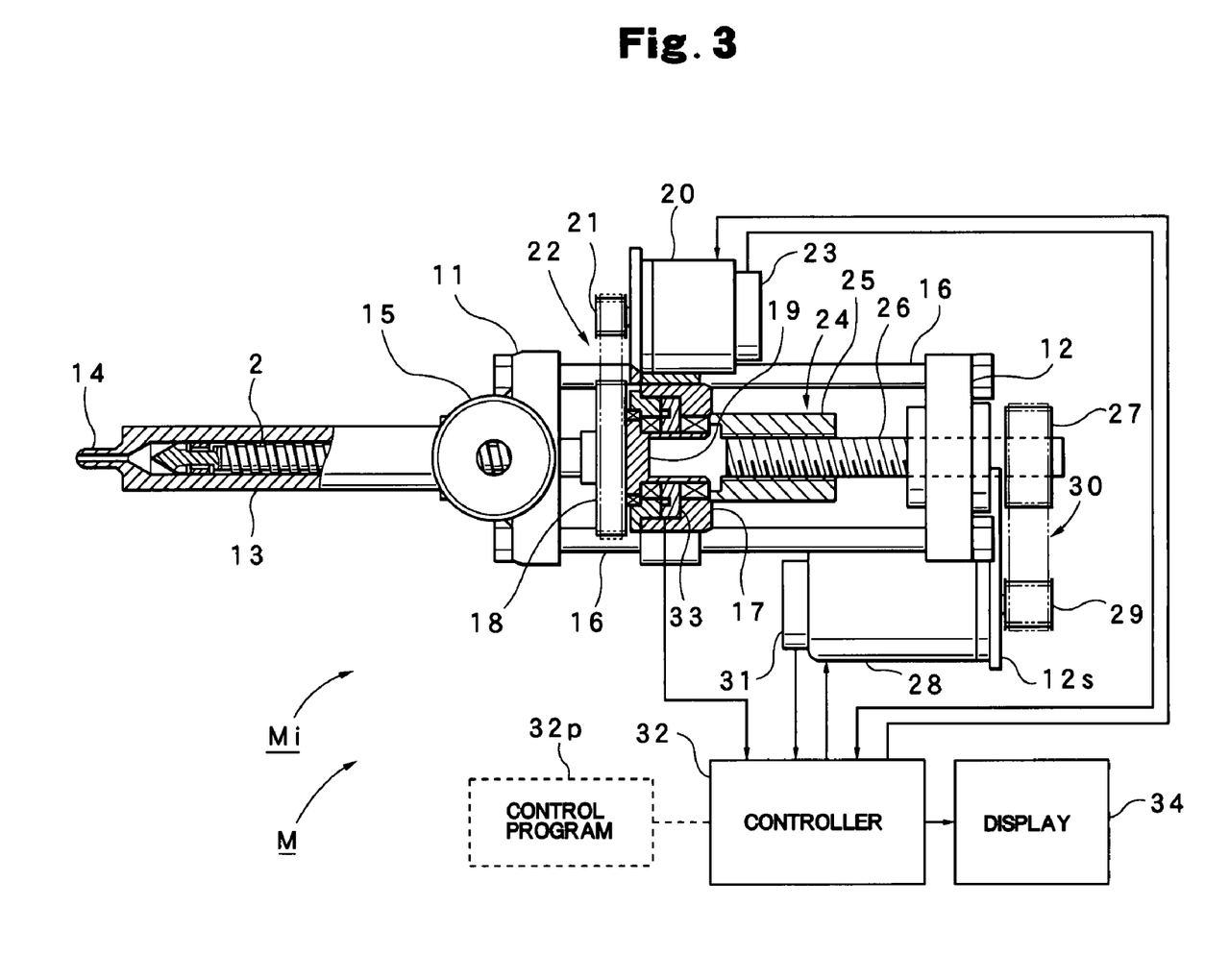
FIG. 3 is a cross-sectional plan view of a section of an injection molding machine that enables implementation of the measurement control method.

The injection molding machine M shown in FIG. 3 shows only the injection device Mi in which a mold clamping device is excluded. The injection device Mi comprises intermediate injection platform 11 and a driving platform 12, and the back end of a heating cylinder 13 is supported by the front surface of the injection platform 11. The heating cylinder 13 comprises an injection nozzle 14 at the front end, and a hopper 15 for supplying the molding materials into the heating cylinder 13 at the back section respectively, and a screw 2 is inserted into the heating cylinder 13.

Meanwhile, four tie bars 16 are installed between the injection platform 11 and the driving platform 12, and a slide block 17 is loaded with the ability to slide freely on the tie bar 16. A rotary block 19 having an integrated driven wheel 18 is supported at the front end of the slide block 17, and the back end of a screw 2 is linked with the center of the rotary block 19. Further, a screw rotation servomotor (electric motor) 20 is attached to the lateral side of the slide block 17, and a driving wheel 21 that is fixed to the rotation shaft of the servomotor 20 is connected to the driven wheel 18 through a rotation transmission mechanism 22. This rotation transmission mechanism 22 may be a gear transduction mechanism using a transmission gear, or a belt transmission mechanism using the timing belt. Furthermore, a rotary encoder 23 for detecting the rotation rate (the number of rotations) of the servomotor 20 is provided on the servomotor 20.

In the mean time, a nut unit 25 is integrally provided coaxially at the rear section of the slide block 17, and a ball screw mechanism 24 is constructed in which the front side of a ball screw unit 26 supported by the driving board 12 with the ability to rotate freely is threaded onto the nut unit 25. Further, a driven wheel 27 is mounted to the back end of the ball screw unit 26 which protrudes toward the back from the driving board 12, and a servomotor (electric motor) 28 for the screw movement is mounted on the supporting board 12s where the driving board 12 is mounted, and the driving wheel 29 fixed on the rotation shaft of the servomotor 28 is connected to the driven wheel 27 through the rotation transduction mechanism 30. This rotation transduction mechanism 30 may be a gear transduction mechanism using a transmission gear, or a belt transduction mechanism using a timing belt. Further, a rotary encoder 31 for detecting the rotation rate (the number of rotations) of the servomotor 28 is provided on the servomotor 28.

Furthermore, in FIG. 3, the numeral 32 indicates a controller equipped in the injection molding machine M, and which can execute a sequence of controls (sequential control) and calculations in the measurement control method that relates to the present embodiment by a stored control program 32p. In the mean time, above mentioned servomotors 20, 28, and the rotary encoders 23, 31 are connected to the controller 32 respectively; and at the same time, a pressure sensor (load cell) 33 which is provided between the rotary block 19 and the slide block 17 is also connected. By this pressure sensor 33, the back pressure Pd in relation to the screw 2 can be detected. Furthermore, a display 34 is connected to the controller 32.

Figure 4:
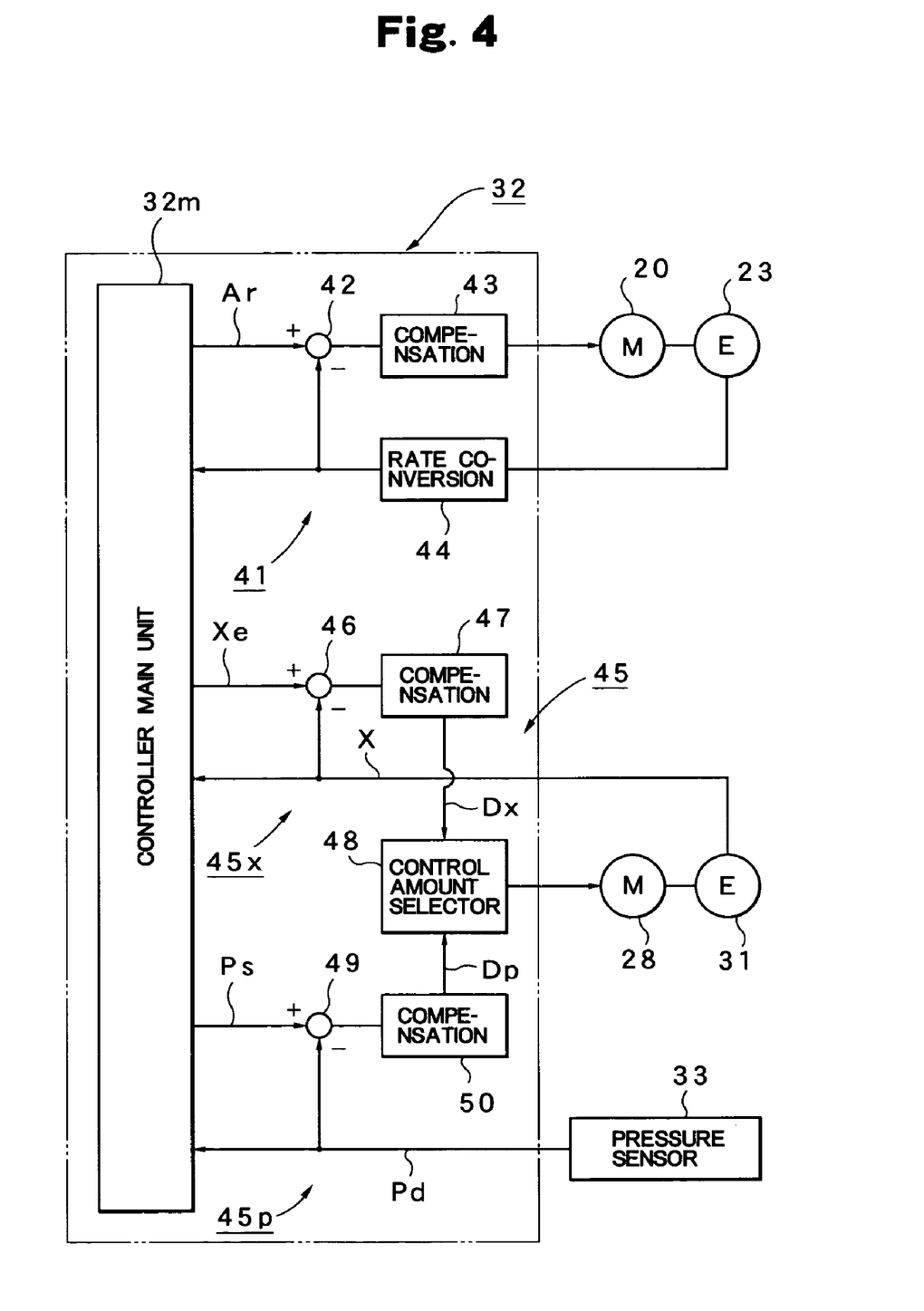
FIG. 4 is a block systemic diagram of the major functional units of a controller provided in the injection molding machine.

Further, FIG. 4 is a block systemic diagram of the major functional units in the controller 32. In the same drawing, 41 is a velocity feedback control system at the screw rotation side, and which comprises a deviation calculation unit 42, a rate compensation unit 43, and a velocity converter 44, and the output of the rate compensation unit 43 is provided to the screw rotation servomotor 20. Further, a command value of the rotation rate for rotating the screw 2, more specifically, a command value of the rotation rate based on the rotation rate pattern Ar to be described hereinafter is provided to one of the input units (non-inverting input unit) of the deviation calculation unit 42 from the controller main unit 32m, and at the same time a detection value of the rotation rate of the screw 2 is provided to the other input unit (inverting input unit) of the deviation calculation unit 42 from the rate converter 44. A detection value of the rotation position of the screw 2 obtained from the rotary encoder 23 attached to the servomotor 20 is provided to the input side of the rate converter 44, and this detection value of the rotation position is converted to a detection value of the rotation rate by the rate converter 44. The detection value of the rotation rate is also provided to the controller main body 32m.

On the other hand, the numeral 45 indicates a feedback control system at the screw movement side, and 45x indicates a position feedback control system, and 45p indicates a pressure feedback control system. The position feedback control system 45x comprises a deviation calculation unit 46 and a position compensation unit 47, and the output of the position compensation unit 47 (a position control amount Dx to be described hereinafter) is provided to the control amount selector 48. Further, a prescribed measurement ending position Xe is provided to one of the input units (non-inverting input unit) of the deviation calculation unit 46 as a command value from the controller main unit 32m, and at the same time a screw position X (detection value) obtained from the rotary encoder 31 attached to the screw retraction servomotor 28 is provided to the other input unit (inverting input unit) of the deviation calculation unit 46.

Meanwhile, the pressure feedback control system 45p comprises a deviation calculation unit 49 and a pressure compensation unit 50, and the output of the pressure compensation unit 50 (a position control amount Dp to be described hereinafter) is provided to the control amount selector 48. Furthermore, a back pressure Ps that becomes a command value is provided to one of the input units (non-inverting input unit) of the deviation calculation unit 49 from the controller main unit 32m, and at the same time, a detection value (back pressure Pd) obtained from the pressure sensor 33 is provided to the other input unit (inverting input unit) of the deviation calculation unit 49. This back pressure Pd is also provided to the controller main unit 32m.

Figure 1:
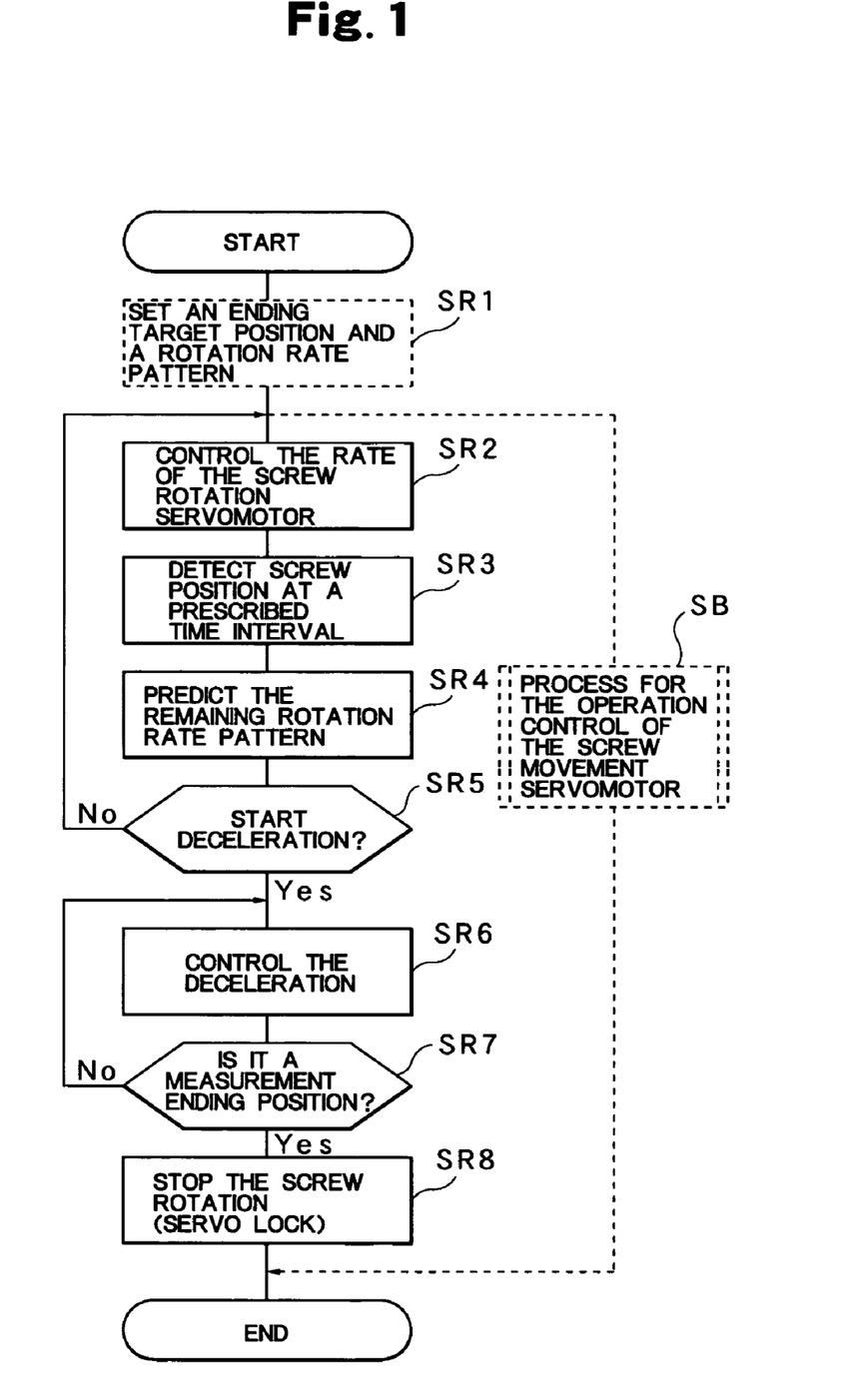
FIG. 1 is a flow chart to show the processing order of the measurement control method that relates to the first embodiment which is a preferred embodiment of the present invention.
Figure 2:
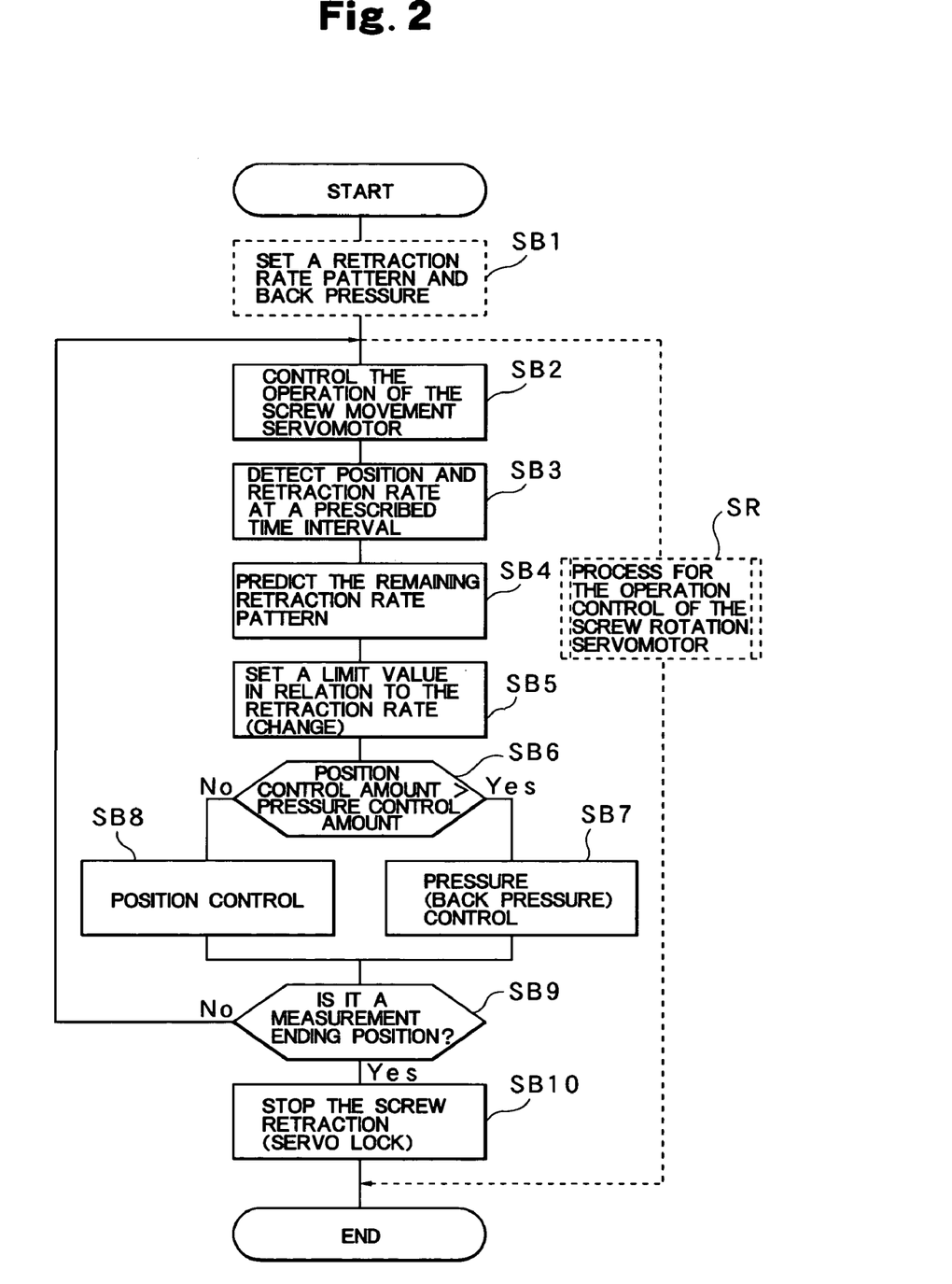
FIG. 2 is a flow chart to show the processing order of the measurement control method that relates to the second embodiment which is a preferred embodiment of the present invention.

Next, a measurement control method that relates to the present embodiment using such injection molding machine M is described according to the flow charts shown in FIG. 1 and FIG. 2 with reference to FIG. 3 through FIG. 9.

In the measurement process, the screw 2 rotates by the screw rotation servomotor 20, and molten resin is accumulated and measured in front of the screw 2 and subsequently, the screw 2 is retracted and the back pressure is provided to the screw 2 by the screw retraction servomotor 28 as the fundamental operation. And then, when the screw 2 retracts to the prescribed measurement ending position Xe, the measurement is completed. The aim of the measurement control method that relates to the present embodiment is particular to stop the screw rotation servomotor and the screw retraction servomotor 28 accurately and reliably at the measurement ending position Xe.

Next, the operation control of the screw rotation servomotor 20 side and the operation control of the screw movement servomotor 28 side are explained separately. In addition, the operation control of the screw rotation servomotor 20 side and the operation control of the screw movement servomotor 28 side are performed simultaneously while relating to each other (Steps SR and SB).

Figure 5:
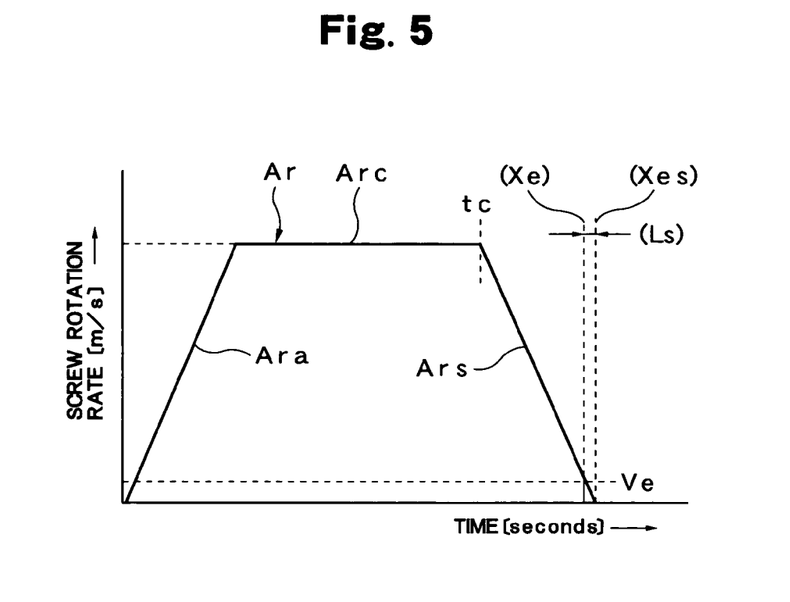
FIG. 5 is a property diagram (rotation rate pattern) of the screw rotation rate in relation to the time when the measurement method that relates to the first embodiment is implemented.
Figure 6:
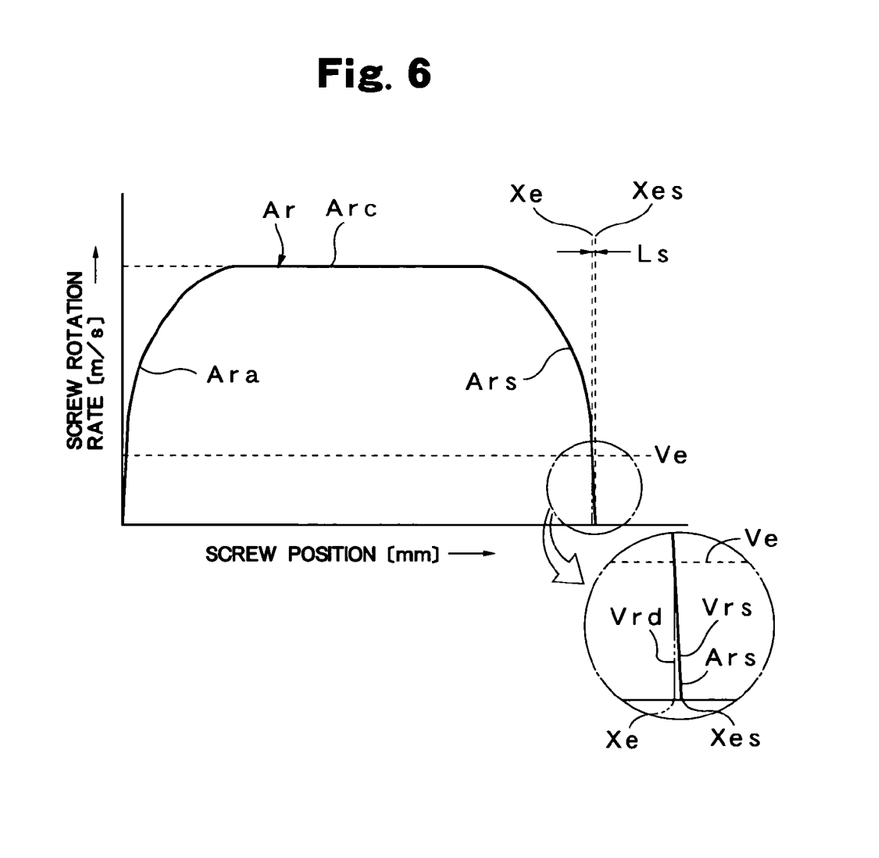
FIG. 6 is a property diagram (rotation rate pattern) of the rotation rate of the screw in relation to the screw position when the measurement method that relates to the first embodiment is implemented.

First, an explanation is given regarding the measurement control method centering on the operation control of the screw rotation servomotor 20 according to the flowchart shown in FIG. 1 with reference to FIG. 5 and FIG. 6. In addition, FIG. 5 shows the rotation rate pattern Ar in which the lateral axis is time, and FIG. 6 shows the rotation rate pattern Ar in which the lateral axis is the screw position.

First of all, an ending target position Xes in which a prescribed length Ls is added to the measurement ending position Xe and a rotation rate pattern Ar to rotate the screw 2 are set in advance (Step SR1). In this case, a minimal length, for instance, about 0.01 through 0.05 mm can be selected at will for the prescribed length Ls. Further, The rotation rate pattern Ar, as shown in FIG. 5 and FIG. 6, is set by the acceleration area Ara to accelerate the rotation rate of the screw 2 by a prescribed acceleration ratio (acceleration factor), a constant rate area Arc in which the rotation rate becomes constant from the end of the acceleration area Ara, and the decelerate area Ars to decelerate by a prescribed deceleration ratio from the end of the constant rate area Arc. By this means, the measurement control method that relates to the present invention in relation to the screw rotation side can be implemented accurately and stably by including at least the constant area Arc and the deceleration area Ars to the rotation rate pattern Ar.

Meanwhile, at the time of the measurement, a command value of the rotation rate to rotate the screw 2 is provided to the deviation calculation unit 42 from the controller main unit 32 based on the prescribed rotation rate pattern Ar, and the operation of the screw rotation servomotor 20 is controlled (rate control) (Step SR2). In this case, the rate deviation of the rotation rate (detection value) of the screw 2 provided from the rate converter 44, and the rotation rate (command value) provided from the controller main unit 32m, are found; and also this rate deviation is provided to the rate compensation unit 43 and the servomotor 20 after undergoing rate compensation. By so doing, feedback control is performed to the rotation rate of the screw 2 so that the rotation rate (detection value) of the screw 2 can conform to a command value.

Further, during the operation of the servomotor 20, a screw position (screw position X) is obtained by the rotary encoder 31 at a prescribed time interval Ts (for instance, intervals of 50 through 200 µs (Step SR3). The controller main unit 32m makes a prediction by calculation for the remaining rotation rate pattern Ar to stop the rotation of the screw 2 at the ending target position Xes from the screw position X which is detected at the prescribed time interval Ts (Step SR4). In this case, since the resin amount which is already measured can be derived by the detection of the actual screw position X, and the remaining resin amount which should be measured from the measured resin amount can be calculated, the rotation rate pattern Ar to stop at the ending target position Xes is predicted from the remaining resin amount. After making the prediction, the rotation of the screw 2 is controlled according to the predicted rotation rate pattern Ar. Further, since the ending target position Xes and the deceleration starting point tc shown in FIG. 5 and FIG. 6 are identified every time a prediction is made by the prediction of the rotation rate pattern Ar, when the screw 2 reaches the deceleration starting point tc shown in FIG. 5, the deceleration (deceleration area Ars) is initiated (Step SR5 and SR6), and when the screw 2 reaches the measurement ending position Xe, the rotation of the screw 2 is stopped; in other words, the stopping of the rotation of the servomotor 20 is controlled and the servo lock is executed (Step SR7 and SR8).

The rotation rate of the predicted rotation rate pattern Ar in the measurement ending position Xe is not zero but is the rate of Ve as shown in FIG. 5 and FIG. 6; however, when reaching the measurement ending position Xe, the screw rotation stop command is output, and the rotation of the screw 2 is forcibly stopped by controlling. Because the size of the rotation rate Ve at that time can be varied by selection of the above prescribed length Ls, the time for reaching the measurement ending position Xe can be reduced by selecting the prescribed length Ls, and the most suitable rate of the rotation rate Ve may be set so that the rotation of the screw 2 is stopped promptly by the output of the screw rotation stop command. Accordingly, the rotation rate Vrs in the deceleration area Ars of the predicted rotation rate pattern Ar becomes zero at the hypothetical ending target position Xes as shown in FIG. 6; however the actual rotation rate Vrd becomes zero at the measurement ending position Xe as shown by the hypothetical line.

In addition, in the actual control, control is performed along an escallop line shown in FIG. 6 since the rotation rate of the screw 2 is detected in relation to the screw position X. Consequently, for instance, when the embedded state of the molding material to the screw 2 varies causing variances at the measurement ending position Xe because deceleration is performed by the deceleration ratio at a constant rate in the deceleration area Ars in relation to time; however, because the detected rotation rate of the screw 2 differs from the deceleration area Ars in relation to the screw position X, the screw 2 can be stopped accurately at the measurement ending position Xe by correcting the command value.

In such manner, in the operation control of the screw rotation servomotor 20 side, as a result of setting the rotation rate pattern Ar to rotate the screw 2 and the ending target position Xes in which the prescribed length Ls is added to the measurement ending position Xe; detecting the screw position X at the prescribed time interval Ts; predicting the remaining rotation rate pattern Ar by a calculation to stop the rotation of the screw 2 at the ending target position Xes from the detected screw position X; controlling the rotation of the screw 2 by the predicted rotation rate pattern Ar; and stopping the rotation of the screw 2 when the screw 2 reaches the measurement ending position Xe, can achieve the shortening of a cycle while improving the control accuracy of the measurement ending position Xe, and improving the molding efficiency and mass productivity while maintaining high molding quality, and furthermore, high speed molding can be realized.

Figure 7A:
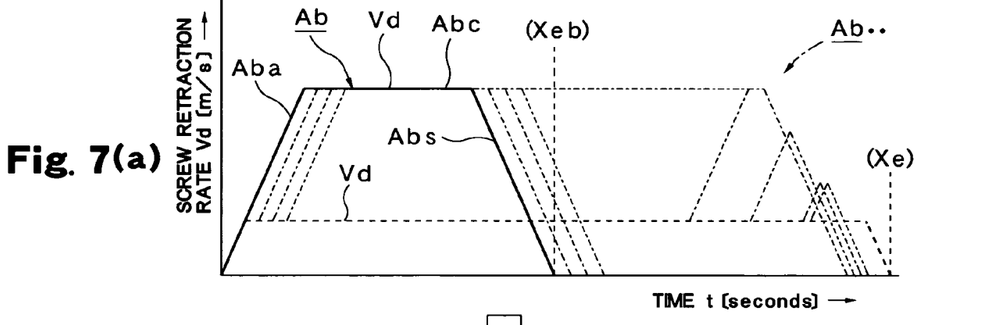
FIG. 7(a) is a property diagram of the screw retraction rate (retraction rate pattern) in relation to the time when the measurement control method that relates to the second embodiment is implemented.
Figure 7B:
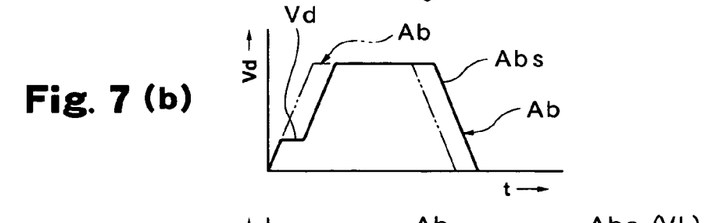
FIG. 7(b) is a property diagram of the screw retraction rate (retraction rate pattern) in relation to the time of the following process of FIG. 7(a) when the measurement control method that relates to the second embodiment is implemented.
Figure 7C:
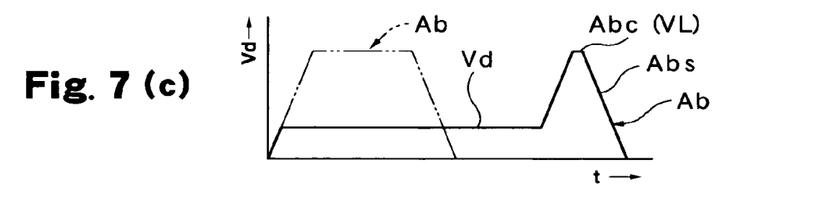
FIG. 7(c) is a property diagram of the screw retraction rate (retraction rate pattern) in relation to the time of the following process of FIG. 7(b) when the measurement control method that relates to the second embodiment is implemented.
Figure 8:
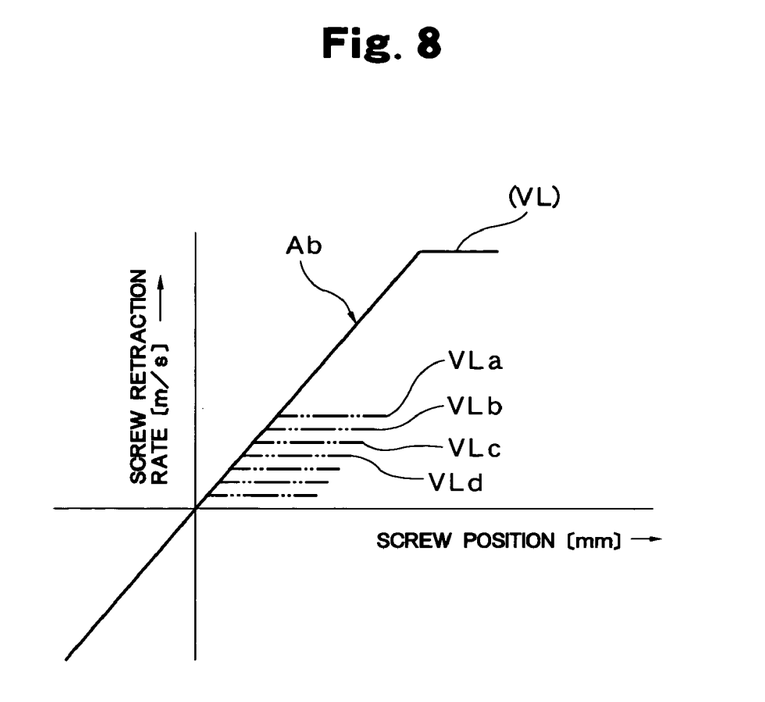
FIG. 8 is an explanatory diagram of the modification principle of the limit value in relation to screw retraction rate when the measurement control method that relates to the second embodiment is implemented.
Figure 9:
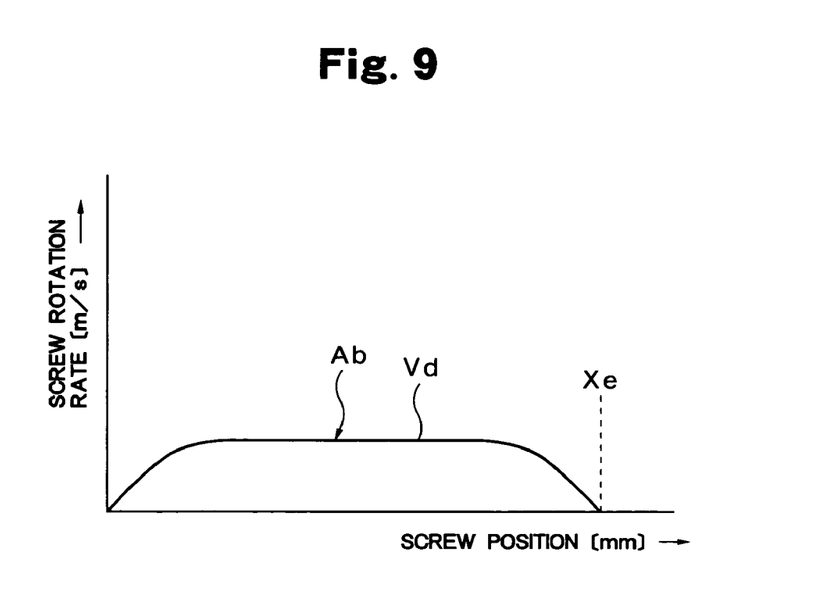
FIG. 9 is a property diagram of the screw retraction rate (retraction rate pattern) in relation to the screw position when the measurement control method that relates to the second embodiment is implemented.

Hereinafter, an explanation is given regarding a measurement control method centering on the operation control of the screw movement servomotor 28 according to a flowchart shown in FIG. 2 with reference to FIG. 7 through FIG. 9.

First, back pressure Ps in relation to the screw 2 and a hypothetical retraction rate pattern Ab for the screw 2 to retract are set in advance (Step SB1). In this case, the retraction rate pattern Ab is set, as shown with a solid line in FIG. 7(a), by an acceleration area Aba to accelerate the retraction rate of the screw 2 by a prescribed acceleration ratio (acceleration factor), a constant rate area Abc in which the retraction rate is constant from the end of the acceleration area Aba, and a deceleration area Abs to decelerate by a prescribed deceleration ratio from the end of the constant rate area Abc. In addition, Xeb indicates the hypothetical measurement ending position in the retraction rate pattern Ab. Further, the retraction rate of the screw 2 in the constant rate area Abc is set to be larger than the actual retraction rate Vd of the screw 2. In other words, a rate which never occurs in reality in relation to the actual retraction rate Vd which is envisioned in advance, is set. In this way, the measurement control method that relates to the present invention in relation to the screw retracting side can be implemented accurately and stably by including at least the constant rate area Abc and the deceleration area Abs to the retraction rate pattern Ab and setting the retraction rate of the screw 2 in the constant rate area Abc so as to be larger than the actual retraction rate Vd of the screw 2.

Meanwhile, at the time of the measurement, retraction control is performed on the screw 2 by controlling the operation of the screw movement servomotor 28 (Step SB2). For this case, the screw position X and the retraction rate Vd of the screw 2 are detected at a prescribed time interval Ts (for instance, the interval of 50 through 200 µs) (Step SB3). Then, the remaining retraction rate pattern Ab is predicted by the calculation from the detected retraction rate Vd (Step SB4). In other words, since the resin amount which is already measured by the detection of the actual retraction rate Vd (screw position X) can be derived and also the remaining resin amount to be measured can be calculated from the measured resin amount, a calculation may be performed so that the additional amount of the resin which is measured already and the remaining resin amount to be measured can conform with the area shown in FIG. 7(a) in which the hypothetical retraction rate pattern Ab is integrated; and by so doing, the remaining retraction rate pattern Ab can be easily predicted. A predicted retraction rate pattern Ab is shown with the hypothetical line in FIG. 7(a), and the predicted retraction rate patterns Ab at mutually different times are shown in FIG. 7(b), FIG. 7(c), FIG. 7(d), and FIG. 7(e).

Further, a limit value VL is set (changed) in relation to the retraction rate of the screw 2 based on the maximum value of the predicted remaining retraction rate pattern Ab (Step SB5) in the controller 32m. Consequently, by setting the limit value VL based on the maximum value of the predicted remaining retraction rate pattern Ab, the measurement control method that relates to the present invention in relation to the screw retracting side can be implemented easily and reliably.

In the mean time, at the time of measurement, back pressure Ps that is the command value is provided to a deviation calculation unit 49 from the controller 32m, and the pressure deviation of the back pressure Pd (detection value) obtained from the back pressure Ps and the pressure sensor 33 is derived in the deviation calculation unit 49, and the pressure deviation is provided to the pressure compensation unit 50, and provided to a control amount selector 48 as the pressure control amount Dp to perform the back pressure control after the pressure is compensated by the pressure compensation unit 50. Further, a command value of the measurement ending position Xe is provided to the deviation calculation unit 46 from the controller 32m, and a position deviation of the screw position X (detection value) obtained by the command value of the measurement ending position Xe and the rotary encoder 31 is derived in the deviation calculation unit 46, and at the same time, this position deviation is provided to the control amount selector 48 as the position control amount Dx to perform the position control in relation to the measurement ending position Xe after the position undergoes compensation by the position compensation unit 47.

The control amount selector 48 selects and outputs the smaller of either the pressure control amount Dp provided from the pressure compensation unit 50 or the position control amount Dx provided from the position compensation unit 47. By so doing, the selected pressure control amount Dp or the position control amount Dx is provided to the servomotor 28 (Step SB6). Accordingly, when the pressure control amount Dp is smaller than the position control amount Dx, the pressure control (back pressure control), in other words, feedback control is performed on the back pressure Pd so as to conform with the set back pressure Ps (Steps SB6 and SB7). On the other hand, when the position control amount Dx is smaller than the pressure control amount Dp, the position control, in other words, feedback control is performed on the screw position X so as to conform to the measurement ending position Xe (Steps SB6 and SB8).

In this case, because the limit value VL is set largely in relation to the retraction rate of the screw 2 from the measurement starting near the front of the measurement ending position Xe, the pressure control (back pressure control) is basically performed. In other words, because the constant rate area Abc remains in the predicted retraction rate pattern Ab as shown in FIG. 7(b) and FIG. 7(c), the retraction rate (maximum value) of this constant rate area Abc is set as the limit value VL, and the position control amount Dx becomes relatively large in relation to the pressure control amount Dp.

Figure 7D:
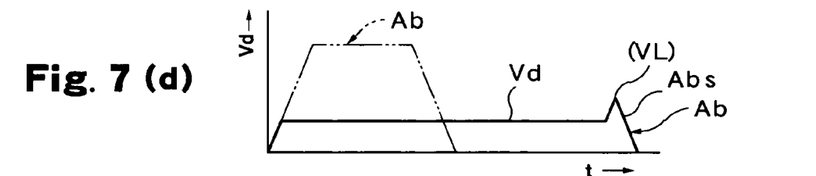
FIG. 7(d) is a property diagram of the screw retraction rate (retraction rate pattern) in relation to the time of the following process of FIG. 7(c) when the measurement control method that relates to the second embodiment is implemented.

In the mean time, after the screw 2 reaches near the front of the measurement ending position Xe, because there is no constant rate area Abc of the retraction rate pattern Ab with retraction of the screw 2 as shown in FIG. 7(d), and only the deceleration area Abs remains, the maximum value of the retraction rate pattern Ab decreases along with the deceleration area Abs, and the limit value VL also decreases. As a result, the limit value VL is set so as to decrease gradually along with the retraction of the screw 2 as shown in FIG. 8 VLa, VLb, VLc, Vld, and so forth. Consequently, because the retraction rate is regulated by the limit value VL, there may be a chance that the position control amount Dx can become relatively smaller than the pressure control amount Dp from near to the front of the measurement ending position Xe to the measurement ending position Xe, and as described above, the control amount selector 48 evaluates the size of the position control amount Dx and the pressure control amount Dp, and when the position control amount Dx is smaller than the pressure control amount Dp, the position control, in other words, feed back control is performed on the position so that the screw position X can be the measurement ending position Xe (Steps SB6 and SB8), and also when the pressure control amount Dp is smaller than the position control amount Dx, the back pressure control, in other words, feed back control is performed on the pressure so that the back pressure Pd can conform with the set back pressure Ps (Steps SB6 and SB7).

In addition, the pressure control amount Dp (pressure deviation) in relation to the back pressure is considerably small in reality, therefore, it is unclear as to which selection is made for either feed back control on the position or feedback control on the pressure. However, by selecting the one which has the smaller control amount, the retraction of the screw 2 can be stably and reliably stopped at the measurement ending position Xe.

Figure 7E:
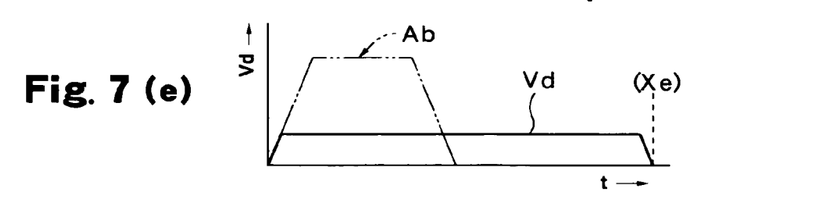
FIG. 7(e) is a property diagram of the screw retraction rate (retraction rate pattern) in relation to the time of the following process of FIG. 7(d) when the measurement control method that relates to the second embodiment is implemented.

Subsequently, when the screw 2 reaches the measurement ending position Xe, the retraction of the screw 2 is stopped, in other words, the rotation of the servomotor 28 is controlled to be stopped, and the servo lock is performed (Steps SB9 and SB10). This state is shown in FIG. 7(e). The retraction rate Vd of the screw 2 becomes zero in this state. FIG. 7(e) shows the retraction rate pattern based on the retraction rate Vd which is actually detected. Further, FIG. 9 illustrates the retraction rate Vd of the screw 2 when the lateral axis is the screw position X; however, because this retraction rate Vd varies so as to be proportional to the rotation rate of the screw 2, it shows nearly the same escallop line with the rotation rate pattern Ar of the screw 2 shown in FIG. 6 even though the range of the longitudinal axis is different.

In this way, for the operation control of the screw movement servomotor 28 side, by setting a back pressure Px in relation to the screw 2 and a hypothetical retraction rate pattern Ab in which the screw 2 retracts while detecting the retraction rate Vd of the screw 2 at a prescribed time interval Ts and setting the limit value VL (Vla . . . ) in relation to the retraction rate, and controlling the retraction of the screw 2 by selecting a smaller control amount of either the control amount Dp that is the pressure control amount Dp to perform the back pressure control at the predicted time, or Dx that is the position control amount to perform the position control in relation to the measurement ending position Xe, and stopping of the retraction of the screw 2 when the screw 2 reaches to the measurement ending position Xe, the accuracy and simplification of the position control in relation to the measurement ending position Xe can be realized while the responsiveness and the stability of the control can be improved; and therefore, the accurate and reliable back pressure control in a minimal length area can be realized.

Further, by simultaneously performing operation control of the screw movement servomotor 28 side and the operation control of the screw rotation servomotor 20 side, both the rotation and retraction of the screw 2 can be stopped accurately and reliably at the set measurement ending position Xe. Therefore this is sufficiently suited for even injection molding of a thin optical disk that recently requires a high degree of measurement precision.

Figure 10:
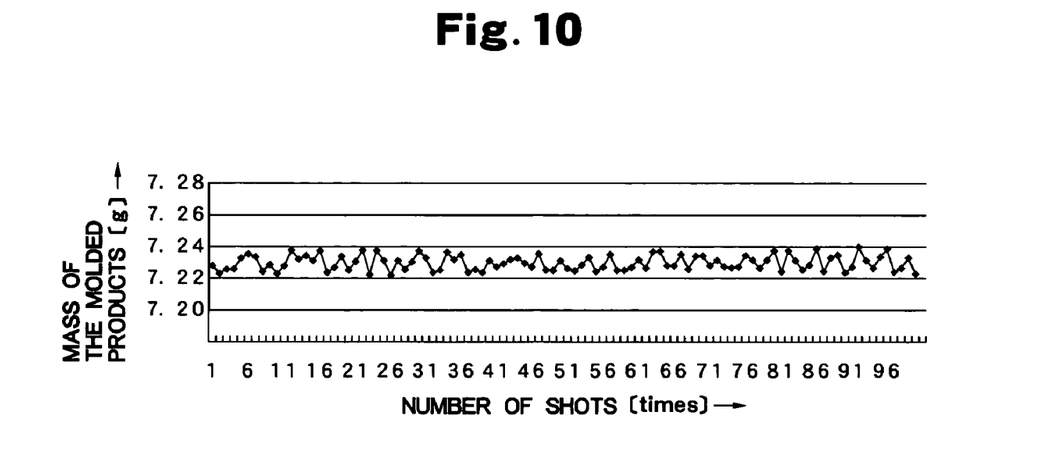
FIG. 10 is a data graph of the mass of molded product in relation to the number of shots when the measurement control method that relates to the embodiment is used.
Figure 11:
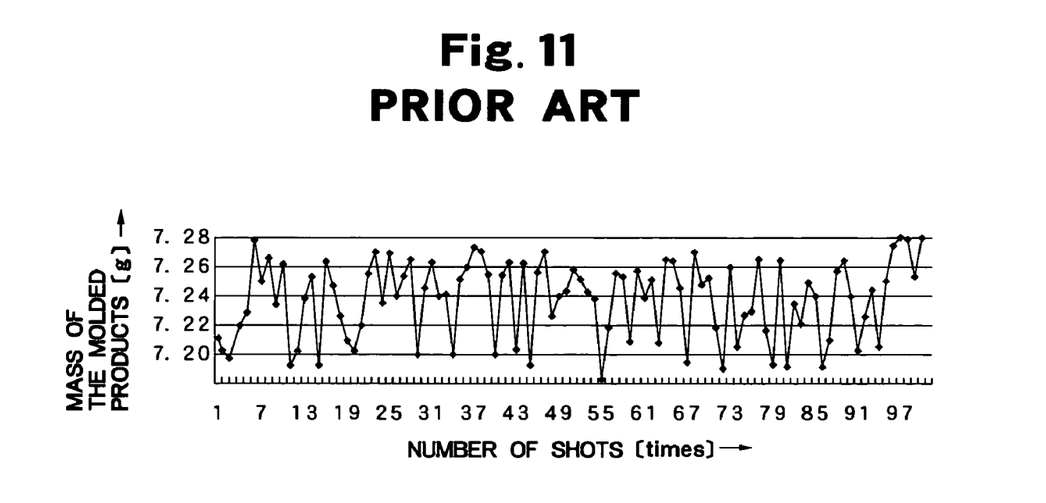
FIG. 11 is a data graph of the mass of molded product in relation to the number of shots when a generic measurement control method which is not the above measurement control method is used.

FIG. 10 shows the mass of molded products in relation to the number of shots when the operation control of the screw movement servomotor 28 side and the operation control of the screw rotation servomotor 20 side described above are performed simultaneously by the measurement control method that relates to the present embodiment. As is clear from the graph, the difference in the mass of the molded products is kept with in approximately 7.22 through 7.24 g, and the difference (error) is about 0.3%. Correspondingly, FIG. 11 shows the mass of the molded products in relation to the number of shots when using the common measurement control method that is not the measurement control method that relates to the present embodiment. In this case, the mass of the molded products are dispersed in the range of approximately 7.18 through 7.28 g, and the difference (error) reaches to 1.4%. Thus, by adopting the measurement control method that relates to the present embodiment, the difference in the mass of molded products can be reduced by ¼ through ⅕ in comparison with a common measurement control method, and stable molding with high quality can be realized.

Detailed explanations relative to the embodiments are given above; however, the present invention is not limited to such embodiments, and details of the construction, amount, value, method, or the like can be modified freely without departing from the scope of the present invention, and additions and eliminations also can be made if necessary.

For instance, an electric type using servomotors 20, 28 are explained as an example for the injection molding machine M; however, other driving types such as a hydrodynamic drive type using a hydraulic cylinder or oil motor may also be used. Further, explanations are given in which at least the constant rate area Arc where the rotation rate of the screw 2 is constant and the deceleration area Ars to decelerate by a prescribed deceleration ratio from the end of the constant rate area Arc are included in the rotation rate pattern Ar while at least the constant rate area Abc where the retraction rate of the screw 2 is constant and the deceleration area Abs to decelerate by a prescribed deceleration ratio or from the end of the constant rate area Abc are included in the retraction rate pattern Ab; however both of them are not limited to the case for decelerating by a prescribed deceleration ratio, the deceleration pattern of the deceleration areas Ars and Abs are left to one's own option. Furthermore, the operation control of the screw rotation servomotor 20 side or the screw movement servomotor 28 side can be used individually and respectively as required.

What is claimed is:

1. A measurement control method of an injection molding machine in which a measurement is performed by rotating a screw, and a measurement is ended when the screw retracts to a preset measurement ending position, comprising the following steps: setting in advance a ending target position in which a prescribed length is added to the measurement ending position, the prescribed length selected to be within 0.01 through 0.05 mm; setting in advance a rotation rate pattern for rotating a screw so that the rotating screw is stopped at the ending target position while a screw position is detected at a prescribed time interval at the time of measurement, calculating a remaining rotation rate pattern for stopping the rotation of the screw at the ending target position from a detected screw position; and controlling the rotation of the screw by the calculated rotation rate pattern to stop when the screw reaches the measurement ending position.

2. A measurement control method of an injection molding machine according to claim 1, wherein the rotation rate pattern includes at least a constant rate area in which the rotation rate of the screw is constant, and a deceleration area to decelerate from the end of the constant rate area by a prescribed deceleration ratio.

3. A measurement control method of an injection molding machine according to claim 2, wherein the rotation rate pattern includes an acceleration area to accelerate the rotation rate of the screw to the constant rate area by a prescribed acceleration ratio.

4. A measurement control method of an injection molding machine in which a measurement is performed by rotating a screw, and a measurement is ended when the screw retracts to a preset measurement ending position, comprising: calculating a ending target position by adding a prescribed length to the measurement ending position, the prescribed length selected to be within 0.01 through 0.05 mm; presetting a rotation rate pattern for rotating a screw so that the rotating screw is stopped at the ending target position; presetting a back pressure in relation to the screw and a retraction rate pattern for the screw to retract; detecting a screw position at a prescribed time interval at the time of the measurement; calculating the remaining rotation rate pattern for stopping the rotation of the screw at the ending target position from the detected screw position; controlling the rotation of the screw to stop while the rotation of the screw is controlled by the calculated rotation rate pattern when the screw reaches the measurement ending position; detecting a retraction rate of the screw at a prescribed time interval; and calculating the remaining retraction rate pattern based on the detected retraction rate and the amount of resin; controlling the retraction of the screw by selecting a smaller control amount of either a pressure control amount for performing the back pressure control or a position control amount for performing the position control to the measurement ending position at the time of prediction, and stopping the retraction of the screw when the screw reaches the measurement ending position.

5. A measurement control method of an injection molding machine according to claim 4, wherein the rotation rate pattern includes at least a constant rate area in which the rotation rate of the screw is constant, and a deceleration area to decelerate from the end of the constant rate area by a prescribed deceleration ratio.

6. A measurement control method of an injection molding machine according to claim 5, wherein the rotation rate pattern includes an acceleration area to accelerate the rotation rate of the screw to the constant rate area by a prescribed acceleration ratio.

7. A measurement control method of an injection molding machine according to claim 4, wherein the retraction rate pattern includes at least a constant rate area in which the retraction rate of the screw is constant, and a deceleration area to decelerate from the end of the constant rate area by a prescribed deceleration ratio.

8. A measurement control method of an injection molding machine according to claim 7, wherein the retraction rate pattern includes an acceleration area to accelerate the retraction rate of the screw to the constant rate area by a prescribed acceleration ratio.

9. A measurement control method of an injection molding machine according to claim 7, wherein the retraction rate of the screw in the constant rate area is set to be larger than the actual screw retraction rate.

10. A measurement control method of an injection molding machine according to claim 4, wherein the maximum value of a predicted remaining retraction rate pattern is set as a limit value for the retraction rate of the screw, and the retraction rate of the screw is regulated by the limit screw.

* * * * *